(12) United States Patent  
Makino

(10) Patent No.: US 7,515,167 B2  
(45) Date of Patent: *Apr. 7, 2009

(54) MULTI-BEAM SCANNING DEVICE AND IMAGE FORMING APPARATUS USING THE SCANNING DEVICE

(75) Inventor: Hideyo Makino, Hachioji (JP)

(73) Assignee: Ricoh Company, Ltd., Tokyo (JP)

( * ) Notice: Subject to any disclaimer, the term of this patent is extended or adjusted under 35 U.S.C. 154(b) by 341 days.

This patent is subject to a terminal disclaimer.

(21) Appl. No.: 11/378,397

(22) Filed: Mar. 20, 2006

(65) Prior Publication Data

US 2006/0158508 A1 Jul. 20, 2006

Related U.S. Application Data

(63) Continuation of application No. 09/820,933, filed on Mar. 30, 2001, now Pat. No. 7,057,634.

(30) Foreign Application Priority Data

Mar. 30, 2000 (JP) .............................. 2000-094899

(51) Int. Cl.  
*B41J 27/00* (2006.01)
(52) U.S. Cl. ...................................... 347/242; 347/257
(58) Field of Classification Search ......... 347/241–242, 347/257  
See application file for complete search history.

(56) References Cited

U.S. PATENT DOCUMENTS

| 4,393,387 | A | 7/1983 | Kitamura |
| 4,788,560 | A | 11/1988 | Miura |
| 4,853,710 | A | 8/1989 | Shimada et al. |
| 4,977,412 | A * | 12/1990 | Komori et al. ............... 347/257 |
| 5,471,236 | A | 11/1995 | Ito |
| 5,774,248 | A * | 6/1998 | Komatsu ..................... 359/204 |
| 5,786,594 | A | 7/1998 | Ito et al. |
| 5,831,758 | A * | 11/1998 | Sakai et al. .................. 359/204 |
| 5,838,479 | A | 11/1998 | Shiraishi |
| 5,870,132 | A * | 2/1999 | Inoue et al. .................. 347/243 |
| 5,905,851 | A | 5/1999 | Morimoto et al. |
| 5,997,153 | A | 12/1999 | Naoe et al. |
| 6,101,018 | A * | 8/2000 | Naiki et al. .................. 359/204 |
| 6,222,611 | B1 | 4/2001 | Asada |
| 6,246,463 | B1 | 6/2001 | Hamada et al. |
| 6,320,647 | B1 * | 11/2001 | Makino ........................ 355/67 |
| 6,366,384 | B1 | 4/2002 | Aoki et al. |
| 7,057,634 | B2 * | 6/2006 | Makino ....................... 347/242 |

FOREIGN PATENT DOCUMENTS

| JP | 2-98462 | 4/1900 |
| JP | 63-197972 | 8/1988 |
| JP | 2-194975 | 8/1990 |
| JP | 5-6077 | 1/1993 |

(Continued)

*Primary Examiner*—Huan H Tran  
(74) *Attorney, Agent, or Firm*—Oblon, Spivak, McClelland, Maier & Neustadt, P.C.

(57) ABSTRACT

In a multi-beam scanning device including a laser diode array having three or more light emitting points, the interval Pi between one of the three or more light emitting points and the adjacent light emitting point is set so as to be not greater than the minimum recording interval Pi' of image information to be recorded on a recording medium. In addition, the three or more light emitting points are arranged such that the corresponding laser beam spots formed on the recording medium are arranged in a line or substantially in a line in the sub-scanning direction B. Thereby recording speed and recording density can be increased.

19 Claims, 7 Drawing Sheets

FOREIGN PATENT DOCUMENTS

| | | |
|---|---|---|
| JP | 08-136841 | 5/1996 |
| JP | 10-123441 | 5/1998 |
| JP | 11-72728 | 3/1999 |
| JP | 11-287963 | 10/1999 |
| JP | 11-295627 | 10/1999 |
| JP | 2000-19442 | 1/2000 |

* cited by examiner

MULTI-BEAM SCANNING DEVICE AND IMAGE FORMING APPARATUS USING THE SCANNING DEVICE

CROSS-REFERENCE TO RELATED APPLICATIONS

This application is a Continuation of U.S. patent application Ser. No. 09/820,933, filed Mar. 30, 2001, and claims priority to Japanese Patent Application No. 2000-094899, filed Mar. 30, 2000. The contents of these applications are incorporated herein by reference in their entirety.

BACKGROUND OF THE INVENTION

1. Field of the Invention

The present invention relates to a multi-beam scanning device for use in image forming apparatus such as laser printers, digital copiers, facsimile machines etc. In particular, the present invention relates to a multi-beam scanning device having e.g., a laser diode (i.e., LD) array or a LED array as a light source. In addition, the present invention relates to an image forming apparatus using the multi-beam scanning device.

2. Discussion of the Background

In recent years, a need exists for image forming apparatus such as laser printers, facsimile devices and digital copiers, which perform high speed and high density recording. Therefore, multi-beam scanning devices which scan a recording medium (photosensitive recording medium) such as photoreceptors using plural laser beams to form a latent image thereon have been developed.

As the light source for use in such multi-beam scanning devices, a light source having two light emitting points is disclosed in Japanese Laid-Open Patent Publication No. 8-136841. This multi-beam scanning device includes a stand unit in which a laser unit having a laser chip, which serves as laser emitting elements emitting first and second laser beams, is fixed on a rotatable stand. The stand unit is rotatably held by a holder.

The laser unit is fixed on the rotatable stand after the laser unit is moved in the up-and-down and left-and-right directions to adjust the position thereof while the two laser light emitting elements are lighted. The position of the laser unit is adjusted such that the first beam is located on a rotation axis of the rotatable stand.

Next, by rotating the stand unit, i.e., by rotating the second beam around the first beam, the distance in the sub-scanning direction between the first beam and the second beam is controlled so as to be the same as the distance between the first scanning line and the second scanning line on a recording medium (i.e., recording interval). At this point, the line connecting the two light emitting elements is not parallel to the sub-scanning direction because the distance between the two light emitting elements is larger than the recording interval. Namely, the starting point of a first scanning line is different from that of the second scanning line. Therefore, in order to adjust such start-position difference in the main scanning direction between the first beam and the second beam, timing of emitting the first and second laser beams is electrically controlled.

This multi-beam scanning device has constitution such that the first beam is positioned on the center of the rotation axis of the rotatable stand and the second beam is positioned apart from the center of the rotation axis. Therefore the multi-beam scanning device has a drawback in that when the center of the first beam is fit to the optical axis of a collimator lens, the light path of the second beam is relatively apart from the optical axis of the collimator lens compared to that of the first beam.

Therefore, the beam spots formed on the surface of a recording medium are not uniform. Namely, beam spots having a desired diameter cannot be obtained.

Because of these reasons, a need exists for a multi-beam scanning device which can form plural laser beam spots having a uniform diameter on a recording medium at a high density to perform high speed and high density recording.

SUMMARY OF THE INVENTION

Accordingly, an object of the present invention is to provide a multi-beam scanning device which can form plural laser beam spots having a uniform diameter on a recording medium at a high density to perform high speed and high density recording.

Another object of the present invention is to provide an image forming apparatus which can produce images having a high recording density at a high speed.

Briefly these objects and other objects of the present invention as hereinafter will become more readily apparent can be attained by a multi-beam scanning device including light emitting array, e.g., a laser diode array which serves as a light source and in which three or more light emitting elements (hereinafter referred to as "points") are arranged (e.g., integral or in a package) at predetermined locations, e.g., at predetermined distances from each other, e.g., at an equal interval, wherein the three or more light emitting points emit respective light beams (hereinafter referred to only as an example as "laser beams") which form laser beam spots on a recording medium, wherein the three or more laser beams scan the recording medium in a main scanning direction while being put on and off to form a light image having a minimum recording interval on the recording medium, wherein the interval between one of the light emitting points and the adjacent light emitting point is not greater than the minimum recording interval, and wherein the light emitting points are arranged such that the three or more laser beam spots on the recording medium are arranged in a line or substantially in a line in a direction orthogonal to the main scanning direction.

It is preferable to use any one of the three or more laser beams as a clock laser beam for determining a timing of starting each main scanning.

The deviation in position of the three or more laser beam spots arranged substantially in a line is preferably not greater than 21.17 μm. The interval between one of the light emitting points and the adjacent light emitting point is preferably not greater than 14 μm.

In addition, the multi-beam scanning device mentioned above preferably has an abnormal lighting detector configured to detect abnormal lighting of the light emitting point emitting the clock laser beam, and a laser beam changer configured to substitute the clock laser beam with any one of the other laser beams emitted by the other light emitting points normally lighting, when the abnormal lighting detector detects abnormal lighting.

Further, an image forming apparatus including any one of the multi-beam scanning devices mentioned above and a recording medium is provided.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawing in which like reference characters designate like corresponding parts throughout and wherein.

DETAILED DESCRIPTION OF THE INVENTION

Hereinafter, embodiments of this invention will be explained referring to drawings.

Figure 1:
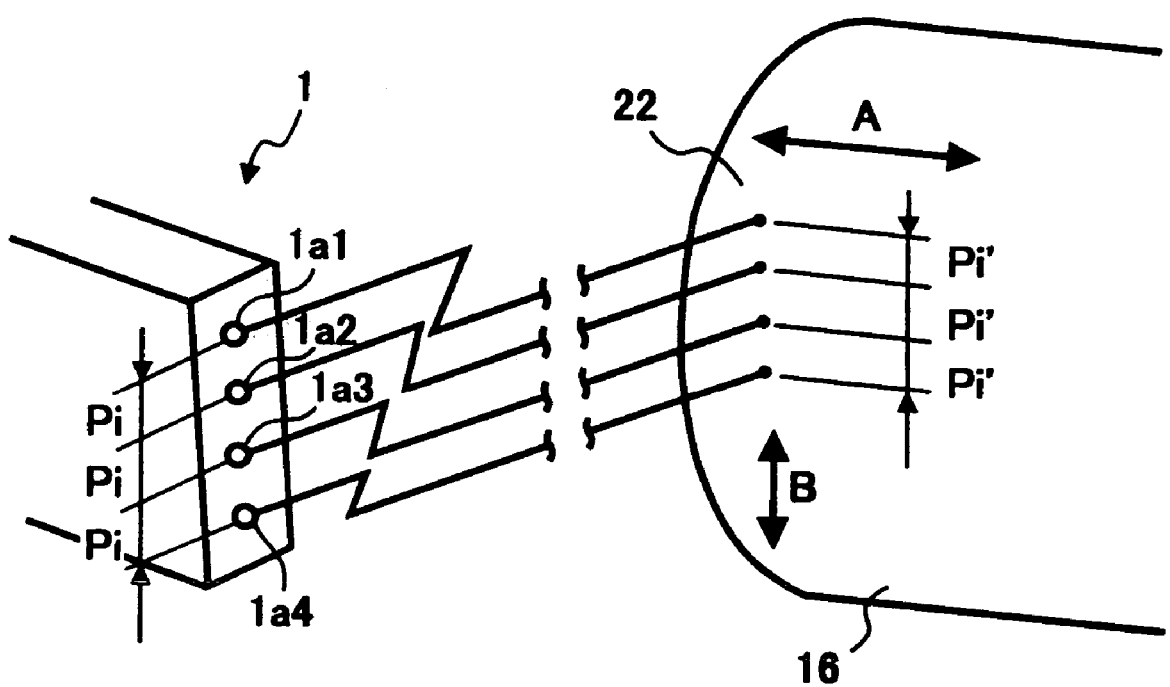
FIG. 1 is a schematic view for explaining the relation between the interval of the light emitting points of the laser diode array in the multi-beam scanning device of the present invention and the minimum recording interval of image information recorded on a photoreceptor drum serving as a recording medium.
Figure 2:
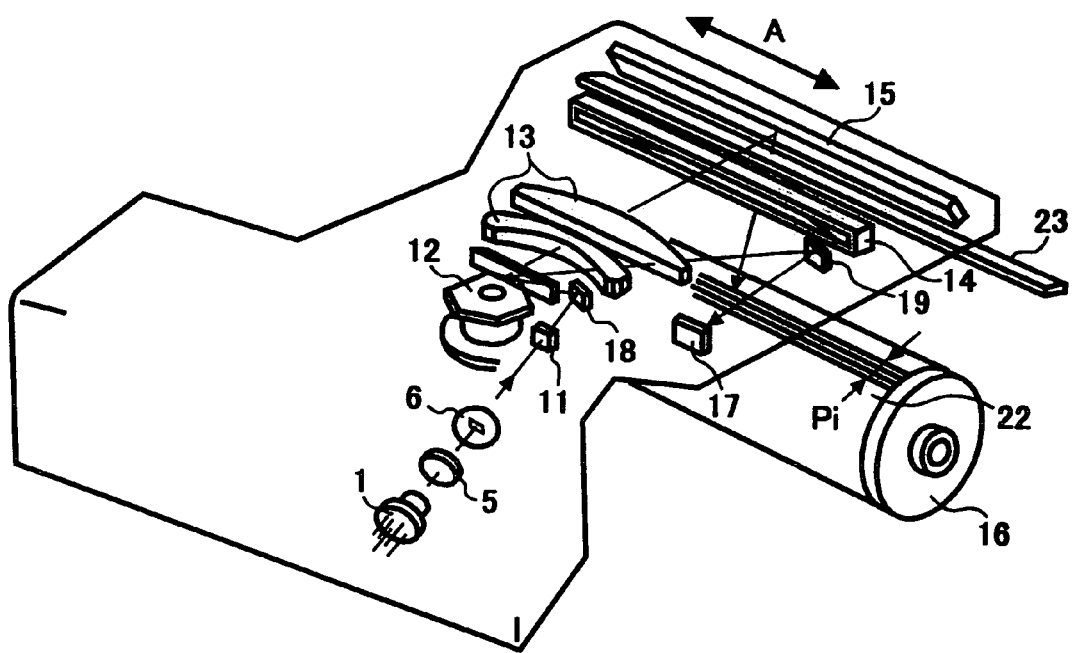
FIG. 2 is a perspective view illustrating the multi-beam scanning device and the photoreceptor drum shown in FIG. 1.
Figure 3A:
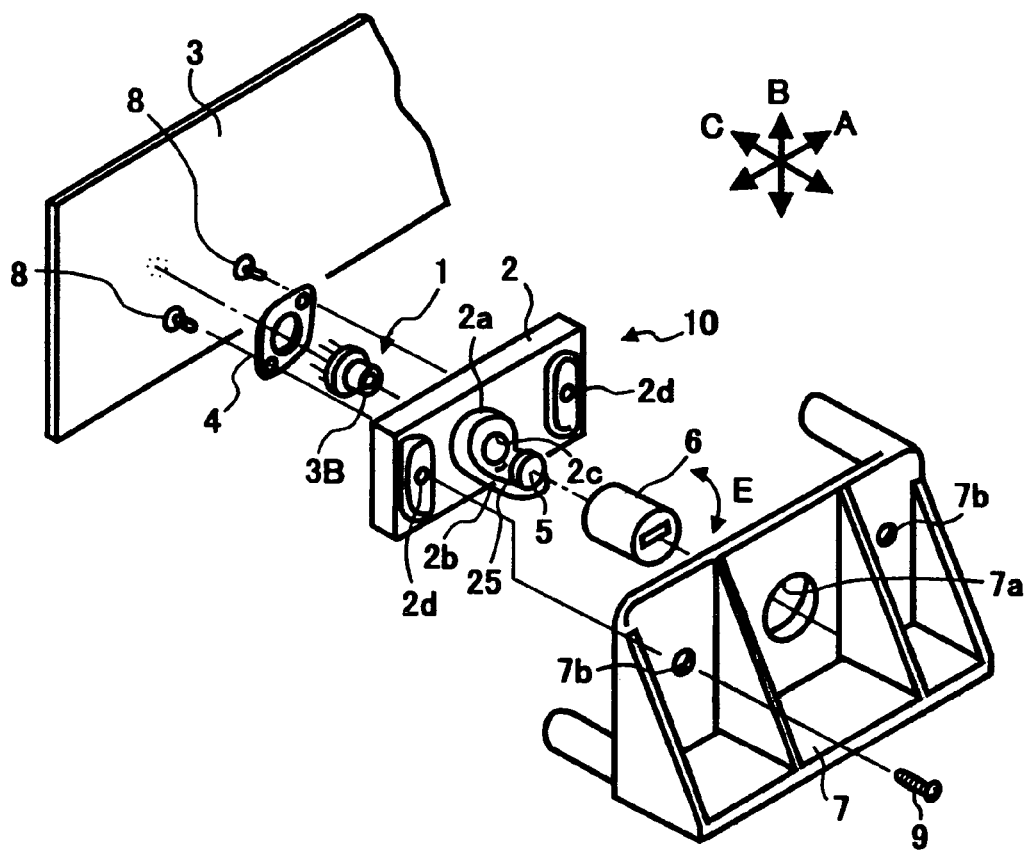
FIGS. 3A and 3B are exploded perspective views illustrating the structure in the vicinity of the light source of the multi-beam scanning device shown in FIG. 2.
Figure 3B:
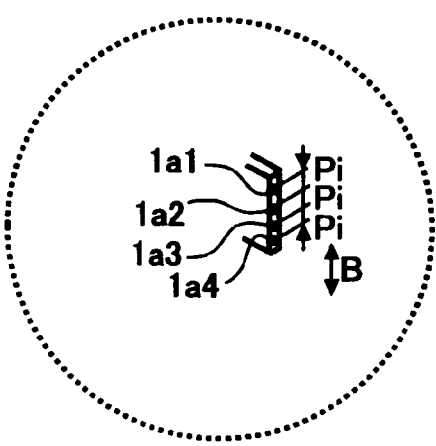
Figure 4:
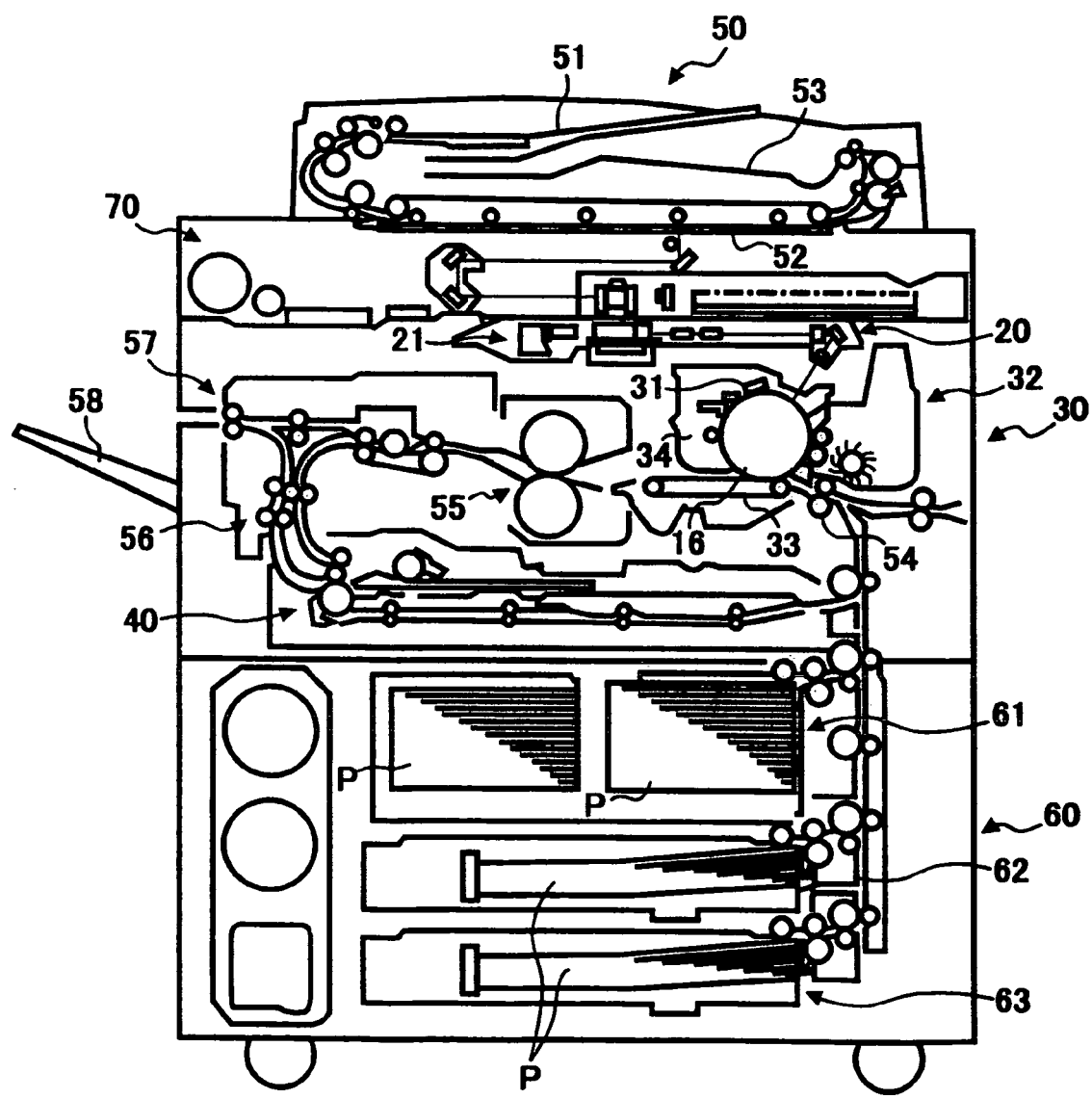
FIG. 4 is a schematic view illustrating the whole structure of a digital copier which is an embodiment of the image forming apparatus of the present invention.

FIG. 1 is a schematic view illustrating the relation between the interval of the light emitting points of the laser diode array of the multi-beam scanning device of the present invention and the minimum recording interval of image information to be recorded on a photoreceptor drum. FIG. 2 is a perspective view illustrating the multi-beam scanning device and the photoreceptor shown in FIG. 1. FIGS. 3A and 3B are exploded perspective views illustrating the structure of the multi-beam scanning device shown in FIG. 2. FIG. 4 is a schematic view illustrating the whole structure of a digital copier which is an embodiment of the image forming apparatus in which the multi-beam scanning device of the present invention is installed.

The digital copier as shown in FIG. 4 consists of a main body 30 of the copier, an automatic document feeder 50 (hereinafter referred to as an ADF), and a paper feeding unit 60.

The ADF 50 automatically feeds original documents, which are set on an original setting tray 51, one by one onto a contact glass 52 of the main body 30. After the image information of an original document is read by a scanner, the ADF 50 discharges the original document onto an original receiving tray 53.

In the upper part of the main body 30, a scanner section 70 which reads the image information of an original document on the contact glass 52, a multi-beam scanning device 20 having a light source 21, and image forming section including a photoreceptor drum 16 serving as a recording medium are arranged.

The scanner section 70 has an optically scanning device consisting of a lamp, plural mirrors and lens, a CCD etc.

Around the photoreceptor drum 16, a charging device 31, a developing device 32, a transfer belt 33 forming a transfer portion, a cleaning device 34 etc., are arranged.

In addition, a fixing device 55 is arranged at a downstream side in the paper feeding direction relative to the photoreceptor drum 16 (i.e., at a left side of the photoreceptor drum 16 in FIG. 4). Further a reversing/discharging section 56 is arranged on a downstream side of the fixing device 55. Furthermore, a double-sided-copy unit 40 is arranged below the fixing device 55.

The optically scanning device in the scanner section 70 optically scans the image of an original document on the contact glass 52. The resultant light image information is focused on the light receiving surface of the CCD by the lens to perform photoelectric conversion.

After being subjected to processing such as A/D conversion etc. by an image processing circuit (not shown), the image signals (i.e., the image information) are subjected to various image processing by an image processing section (not shown). Then a light image based on the image signals is written on the photoreceptor drum 16, whose surface has been uniformly charged by the charging device 31, by the below-mentioned multi-beam scanning device 20 using laser beams. Thus, an electrostatic latent image is formed on the photoreceptor 16.

The photoreceptor drum 16 rotates in the clockwise direction in FIG. 4 and thereby the latent image is moved to a developing position at which the latent image faces the developing device 32. Then the latent image is developed by the developing device 32, resulting in formation of a toner image (i.e., a visual image) of the photoreceptor drum 16.

On the other hand, a receiving paper P, which is contained in any one of a tandem-type large paper feeding device 61 and universal trays 62 and 63, is fed toward the main body 30.

The receiving paper P is then fed upward in the main body 30. When the leading edge of the receiving paper P strikes a registration roller 54, the paper is stopped there for a moment. Then the receiving paper P is timely fed by the registration roller 54 such that the toner image formed on the photoreceptor drum 16 is accurately transferred on a proper position of the receiving paper P. Thus, the toner image on the photoreceptor drum 16 is transferred onto the receiving paper P.

After being separated from the photoreceptor drum 16, the receiving paper P is fed to the fixing device 55 by a transfer belt 33 and the toner image is fixed by a fixing roller in the fixing device 55.

After the fixing process, the receiving paper P is fed straight by the reversing/discharging device 56 and then discharged on a paper receiving tray 58 by a discharge roller 57 when an image is formed on one side of the receiving paper P.

When double-sided images are formed on a receiving paper P, the receiving paper P, in which an image has been formed on one side thereof, is reversed by the reversing/discharging device 56 and then fed to the double-sided copy unit 40. The receiving paper P is again fed to the image forming section, at which the photo receptor drum 16 is arranged, to form an image on the backside of the receiving paper P. After the images are fixed by the fixing device 55, the receiving paper P is fed straight by the reversing/discharging device 56 and discharged to the paper receiving tray 58 by the discharge roller 57.

As shown in FIG. 3A, the multi-beam scanning device 20 has a semiconductor laser diode array (hereinafter referred to as a laser diode array) in which-three or more light emitting points are arranged in a package at equal intervals. In the embodiment as shown in FIG. 3B, four light emitting points $1a_1$ to $1a_4$ are arranged at equal intervals. The surface of the photoreceptor drum 16 is scanned by four laser beams emitted from the light emitting points $1a_1$ to $1a_4$ to record image information on the photoreceptor drum 16.

As shown in FIG. 1, the interval Pi between one of the four light emitting points $1a_1$ to $1a_4$ and the adjacent light emitting point in the multi-beam scanning device 20 is set so as to be not greater than the minimum recording interval Pi' of image information to be recorded on the photoreceptor drum 16. In addition, the four light emitting points are arranged such that the laser beams emitted therefrom form on the photoreceptor drum 16 laser beam spots arranged in a line in a direction B (i.e., in a sub-scanning direction) orthogonal to a main scanning direction A. The light emitting points may be arranged such that the laser beams form on the photoreceptor drum 16 laser beam spots arranged substantially in a line in the direction B, namely the laser beam spots may be arranged while deviating from a line by an allowable distance mentioned below.

As shown in FIG. 2, the multi-beam scanning device 20 changes the plural laser beams emitted by the laser diode array 1 to a parallel light pencil or a substantially-parallel light pencil using a collimate lens 5. The light pencil is regulated by an aperture 6 (whose structure is simplified in FIG. 2).

The regulated laser beams reach a polygon mirror 12 after passing through a cylinder lens 11 and a mirror 18.

Since the polygon mirror 12 rotates, the laser beams are scanned in the direction indicated by an arrow A (i.e., the main scanning direction).

The four laser beams reflected at the polygon mirror 12 are changed to focused light by a focusing device consisting of an fθ lens 13 and a toroidal lens 14, and then projected as light spots on a surface 22 of the photoreceptor 16 via the mirror 15 and a dust proof glass 23. At this point, the surface 22 of the photoreceptor 16 is located at a focusing position of the light image, i.e., a beam waist position of the laser beams.

In FIG. 2, numerals 19 and 17 denote a mirror and a photo-detector, both of which are arranged in the outside of the effective scanning range in the width direction (i.e., the direction A). As mentioned later in detail, laser beams moving in the main scanning direction are detected in each main scanning operation by the mirror 19 and the photo-detector 17 to synchronize the starting position of each main scanning.

Next, the constitution of the multi-beam scanning device 20 and its vicinity will be explained referring to FIGS. 3A and 3B. In FIG. 3A, arrows A, B and C denote a main scanning direction, a sub-scanning direction and an optical axis direction, respectively.

In the multi-beam scanning device 20, the above-mentioned laser diode array 1 is a light source which has four light emitting points $1a_1$ to $1a_4$ each of which emits a laser beam. The laser diode array 1, a holder 2, a control/drive circuit device 3, a pressing element 4, a light collecting element (e.g., a collimator lens) 5, the aperture 6, and a support unit (a bracket) 7 constitute a unit.

The laser diode array 1 is secured on the holder 2 by screwing the pressing element 4 to substantially the center of the holder 2 with two screws 8.

When the laser diode array 1 is secured on the holder 2, the laser diode array 1 is fixed, for example, by a positioning jig (not shown) such that the four light emitting points $1a_1$ to $1a_4$ on the laser diode array 1 are arranged in a line or in approximately a line in the sub-scanning direction indicated by the arrow B.

In the holder 2, an engaging section 2a is installed in a protruding manner, and a projection 2b is formed on the leading edge side of the engaging section 2a.

The collimator lens 5 is preferably fixed on the projection 2b of the holder 2 using an ultraviolet crosslinking adhesive 25. When the collimator lens 5 is fixed with an ultraviolet crosslinking adhesive 25, at first the collimator lens 5 on the ultraviolet crosslinking agent 25 is slightly moved in the directions of A, B and C while the laser diode array is emitting laser beams, to adjust the positions of the optical axis and the collimator lens 5. Then the collimator lens 5 is fixed by irradiating the ultraviolet crosslinking adhesive 25 with ultraviolet rays, resulting in crosslinking of the adhesive 25.

Namely, by adjusting the optical axis of the collimator lens 5 so as to be on substantially the center of a hole 2c formed in the engaging section 2a of the holder 2, the optical axis of the collimator lens 5 can be set so as to be located at the center of the light emitting points $1a_1$ to $1a_4$ (i.e., the center between $1a_2$ and $1a_3$) of the laser diode array 1. The optical axis is in particular parallel to the direction of light emission of the light emitting elements (e.g., laser diodes).

The collimator lens 5 is covered by the aperture 6, which is a cylinder having a groove and a bottom, to form a subassembly 10. The subassembly 10 is supported by the support unit (bracket) 7.

When the subassembly 10 is fixed on the bracket 7, at first the engaging section 2a of the holder 2 is inserted in an engaging hole 7a formed on substantially the center of the bracket 7 such that the engaging section 2a can rotate in a direction indicated by an arrow E. Then the subassembly 10 is fixed to the bracket 7 by screwing screws 9 to holes 2d.

In this case, at first the screws 9 are loosely fixed to the holes 2d such that the whole subassembly 10 can be rotated in the direction E within the gap between the screw 9 and a hole 7b. After the position of the subassembly 10 is adjusted such that the four light emitting points $1a_1$ to $1a_4$ of the laser diode array 1 are arranged in a line or substantially in a line (the allowable deviation is mentioned later) in the sub-scanning direction indicated by the arrow B, the subassembly 10 is securely fixed to the bracket 7.

This adjustment can be easily performed by measuring the positions of the edge light emitting points $1a_1$ and $1a_4$ using, for example, a CCD camera.

Finally, by mounting a control/drive circuit 3 to the subassembly 10, the multi-beam scanning device 20 can be completed.

Figure 5:
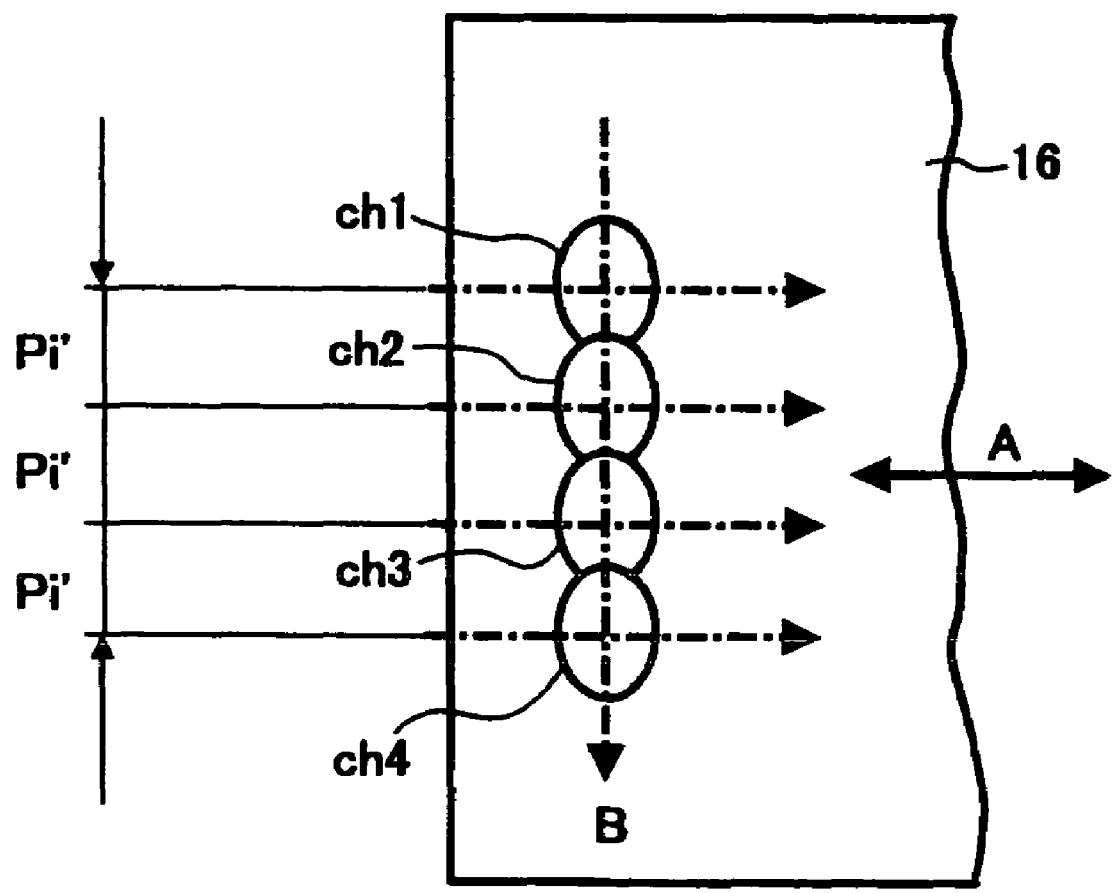
FIG. 5 is an exploded view of FIG. 1 and illustrates the laser beam spots formed on the photoreceptor drum.

FIG. 5 illustrates laser beam spots formed on the photoreceptor drum 16 by the four laser beams, which are emitted by the laser diode array 1 of the multi-beam scanning device 20.

As shown in FIG. 5, the four laser beam spots ch1 to ch4 are formed on the photoreceptor drum 16 by the four laser beams emitted by the laser diode array 1 so as to be in a line or substantially in a line in the sub-scanning direction B.

As can be clearly understood from FIG. 2, in the multi-beam scanning device 20 the plural laser beams are focused at a point in the vicinity of the polygon mirror 12 by the cylinder lens 11, and thereby all the plural laser beams are deflected by the polygon mirror 12 at the same time, an angle of deflection being changed for the scanning process.

The polygon mirror 12 and the photoreceptor drum 16 are arranged such that the surface of the light beam deflecting element (the polygon mirror 12) is conjugated with the surface of the photoreceptor 16 to be scanned.

Provided that the interval between one of the light emitting points and the adjacent light emitting point in the laser diode 1 is Pi, the focal length of the collimator lens 5 is fco, the focal length of the light beam shaping element (the cylinder lens) 11 is fcy, the pitch of the beams on the surface of the polygon mirror 12 is Ppp, the lateral-direction magnification of the light beam spot issued by the light emitting elements with respect to the light beam spot on the recording medium in the sub-scanning direction is βs, and the minimum recording interval (i.e., the minimum pitch of the beam spots on the surface of the photoreceptor drum 16 to be scanned, in particular corresponding to the minimum pitch between dots on a recording medium, the dots being printed by means of the multi-beam scanning device of the present invention) is Pi', the following equations can be obtained:

$$Pi = (fco/fcy) \cdot Ppp \qquad (1)$$

$$Pi' = \beta s \cdot Ppp \qquad (2)$$

By equations (1) and (2), the following equation (3) can be obtained:

$$Pi = (fco/fcy) \cdot (Pi'/\beta s) \qquad (3)$$

When substituting specific values into the factors in equation (3), i.e., fco=14.94 mm, βs=0.637 and fcy=70.9 mm, Pi'=42.33 μm which corresponds to the minimum recording interval when the recording density is 600 dpi, Pi is determined as 14 μm.

Thus, when the interval Pi of the light emitting points is set so as to be 14 μm, laser beam spots having the minimum recording interval (42.33 μm) can be formed on the photoreceptor 16. Namely, the interval Pi between one of the four light emitting points $1a_1$ to $1a_4$ and the adjacent light emitting point in the laser diode array 1 can be set so as to be not greater than the minimum recording interval Pi' of the image information to be recorded on the photoreceptor drum 16 by properly selecting the collimator lens 5, cylinder lens 11 and polygon mirror 12 and controlling the conditions thereof.

Figure 6:
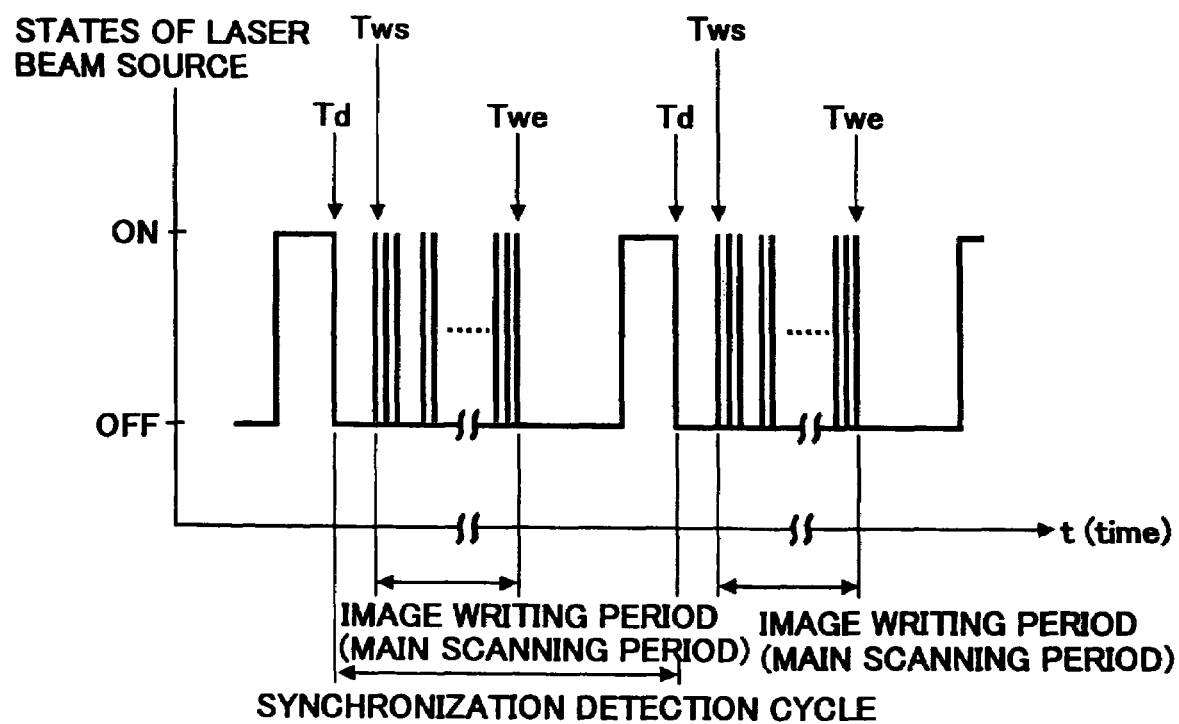
FIG. 6 is a timing chart illustrating ON and Off states of the laser source of the multi-beam scanning device as shown in FIG. 2 when an image is recorded.

FIG. 6 is a timing chart illustrating ON/OFF states of the laser light source of the multi-beam scanning device shown in FIG. 2.

As shown in FIG. 6, the multi-beam scanning device 20 controls the timing of starting to record image information on the photoreceptor 16 in each main scanning, using a laser beam passing through the photodetector 17 (see FIG. 2), the laser beam being deflected by the polygon mirror.

At this point, any one of the four laser beams emitted by the laser diode array 1 is used as the laser beam (hereinafter referred to as a clock laser beam) which is used for determining the timing of starting to record information on the photoreceptor 16 in each main scanning.

Since the time at which the clock laser beam should irradiate the photodetector 17 before each main scanning is known (i.e., predetermined), only the light emitting point, which is to emit the clock laser beam, is lighted at a time just before the clock laser beam should irradiate the photodetector 17 to obtain the detection signal for synchronization.

When a predetermined time (which can be changeable) passes after the detection signal is obtained by the photodetector 17 at a point Td as shown in FIG. 6, namely, at a point Tws as shown in FIG. 6, writing of image information is started (i.e., one main scanning is performed). In this writing operation, the four light emitting points emit respective laser beams.

When the image writing operation (i.e., the one main scanning) is completed at a point Twe as shown in FIG. 6, the light emitting points are switched off to be ready for the next signal detection for synchronization and the next main scanning.

By repeating these operations, a light image can be formed on the photoreceptor drum 16, resulting in formation of a latent image.

In the photodetector 17 as shown in FIG. 2, the four laser beam spots are also formed in a line in the sub-scanning direction. However, in this embodiment, when the laser beams are detected by the photodetector 17, the laser beams do not pass through the toroidal lens 14, and therefore the laser beams have a shape like a vertically long slit instead of a focused light beam.

As mentioned above, in this multi-beam scanning device 20 any one of the laser beams emitted by the laser diode array 1 is used as the clock laser beam.

Therefore, a low-cost and simple information-writing-position detecting device, which is similar to those of one-beam scanning devices performing scanning using only one beam, can be used for the multi-beam scanning device of the present invention. Therefore cost-cutting is possible.

Any one of the laser beams emitted by the four light emitting points $1a_1$ to $1a_4$ can be used as the clock laser beam.

As shown in FIG. 1, four laser beams emitted from the four light emitting points $1a_1$ to $1a_4$ irradiate the surface of the photoreceptor drum 16 to be scanned, resulting in formation of four laser beam spots thereon. In general, it is said that when variation in position of the laser beam spots in the main scanning direction is not greater than ½, the image qualities of the resultant image do not deteriorate.

Provided that the recording density is 600 dpi, ½ dot corresponds to 21.17 μm (25.4 mm/600×2). Therefore, it can be said that when the four light emitting points are arranged such that the variation in position of the four laser beam spots in the main scanning direction is not greater than 21.17 μm, the resultant images have good image qualities.

Namely, when the four laser beams which are emitted by the four light emitting points $1a_1$ to $1a_4$ of the laser diode array 1 and which form four laser beam spots on the photoreceptor drum 16 as shown in FIG. 5 can be arranged substantially in a line in the sub-scanning direction B such that the variation in position of the laser beam spots in the main scanning direction is not greater than, for example, 21.17 μm and interval between one of the laser beam spots and the adjacent laser beam spot is equal to the minimum recording interval Pi', images having good image qualities can be obtained. This is because the variation in position of the four laser beam spots in the direction A (i.e., the main scanning direction) is not greater than ½ dot.

As mentioned above, since the positions of the light emitting points at both end positions can be measured using a CCD camera, it is possible to control the variation in position of the four laser beam spots so as to be not greater than 21.7 μm.

Thus, since the multi-beam scanning device 20 has constitution such that the intervals Pi of the one of the light emitting points $1a_1$ to $1a_4$ and the adjacent light emitting point in the laser diode array1 is not greater than the minimum recording interval Pi', as shown in FIG. 1, and in addition laser beam spots formed by the plural laser beams emitted from the light emitting points $1a_1$ to $1a_4$ are arranged on the photoreceptor drum 16 in a line or substantially in a line in the sub-scanning direction, plural laser beams can be scanned at the same time in each scanning.

Therefore, the variation in position of the laser beam spots on the photoreceptor drum 16 can be minimized in the multi-beam scanning device 20 whereas the structure of the scanning device 20 is as simple as one-beam scanning devices performing scanning using one laser beam. Since scanning is performed using plural laser beams, recording speed is much faster than that of one-beam scanning devices. In addition, since laser beam spots having a suitable diameter can be formed on the photoreceptor drum 16, high density recording is possible.

Figure 7:
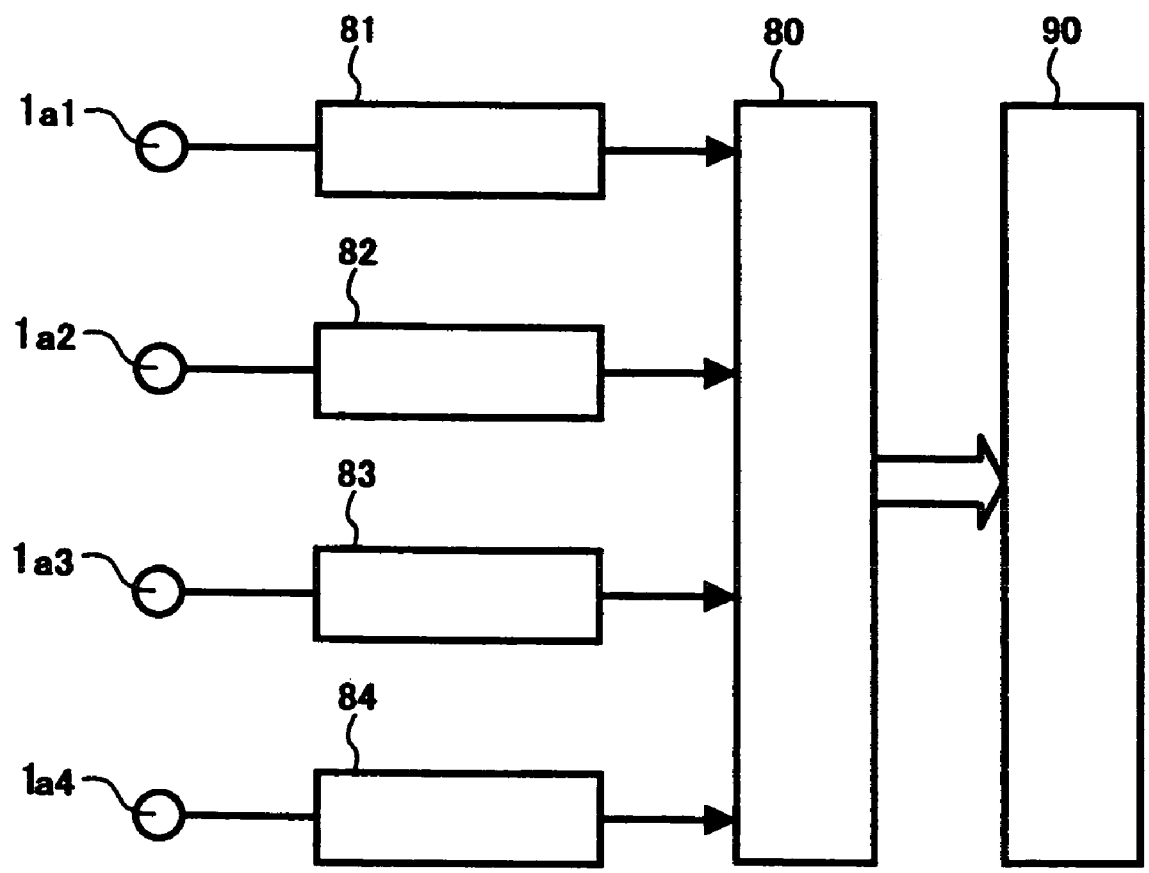
FIG. 7 is a block diagram illustrating another embodiment of the multi-beam scanning device of the present invention.

FIG. 7 is a block diagram illustrating another embodiment of the multi-beam scanning device of the present invention. Each of the parts already shown in FIGS. 1 to 5 has the same reference number.

The difference between the multi-beam scanning device of this embodiment and the multi-beam scanning device 20 as shown in FIGS. 1 to 6 is as follows.

The multi-beam scanning device of this embodiment has an abnormal lighting detector 80 which detects abnormal lighting of a light emitting point emitting a clock laser beam; and laser beam changer 90 which, when the abnormal lighting detector 80 detects abnormal lighting of the light emitting point emitting the clock laser beam, changes the clock laser beam to another laser beam emitted from one of the other normal light emitting points.

In this multi-beam scanning device, whether the four light emitting points $1a_1$ to $1a_4$ are normally lighting is judged based on the current flowing in the laser diode in each of the light emitting points $1a_1$ to $1a_4$. Therefore four current detecting circuits 81 to 84 are provided to measure the respective current flowing in the light emitting points $1a_1$ to $1a_4$. The abnormal lighting detector 80 judges whether there is a light emitting point abnormally lighting based on operating characteristic(s) e.g., (electrical) driving conditions of the light emitting elements (diodes) e.g., based on temperature of the light emitting elements and/or based on voltage drop at the light emitting elements and/or based on the amount of emitted light which may be deflected by the photodetectors (e.g., including detector 17) and/or based on the currents measured by the current detecting circuits 81 to 84. For instance, abnormality is deemed to be detected if the operating characteristic(s) is (are) not within a predetermined range of target value(s).

The currents flowing in the four laser diodes in the light emitting points $1a_1$ to $1a_4$ are generally controlled such that the quantity of light emitted by the laser diodes is a predetermined value. When the quantity of light emitted by any one of the laser diodes in the light emitting points $1a_1$ to $1a_4$ accidentally decreases, control of flowing a larger current than usual is exercised against the laser diode to increase the quantity of light therefrom.

In this multi-beam scanning device, the currents flowing in the four laser diodes are detected by the respective four current detecting circuits 81 to 84, and the abnormal lighting detector 80 judges from the detected currents whether there is a light emitting point abnormally lighting in the light emitting points $1a_1$ to $1a_4$.

When the abnormal lighting detector 80 detects that the light emitting point which has emitted the clock laser beam is abnormally lighting, the laser beam changer 90 changes the clock laser beam to any one of the laser beams emitted from the normal light emitting points is used thereafter as the clock laser beam.

For example, when the laser beam emitted by the light emitting point shown as $1a_1$ in FIG. 7 is used as the clock laser beam and it is judged that the light emitting point $1a_1$ abnormally lights (i.e., the luminous intensity decreases), it is judged whether the other light emitting points $1a_2$ to $1a_4$ are normally lighting (e.g., by respective photoderectors or by detector 80). When it is judged that the other light emitting points are normally lighting, any one of the laser beams emitted from the light emitting points $1a_2$ to $1a_4$ is used thereafter as the clock laser beam.

Thus, in this embodiment, even if the light emitting point emitting a clock laser beam abnormally lights, the information writing operation can be continued without stopping the operations of the multi-beam scanning device (i.e., without causing a mechanical trouble) because the synchronization signal can be output.

On the contrary, the clock laser beam is fixed in conventional multi-beam scanning devices. Therefore, if the light emitting point emitting a clock laser beam abnormally lights, the whole multi-beam scanning device stops because a synchronization signal for starting to write image information cannot be output.

Such multi-beam scanning devices cannot be used thereafter until a serviceman repair the devices, and therefore it is very inconvenient.

In the embodiment of the multi-beam scanning device, when the light emitting point emitting a clock laser beam abnormally lights, the clock laser beam is changed to another laser beam emitted by one of the other normal light emitting points, and therefore the operation of the multi-beam scanning device can be continued.

In this case, if the image density is, for example, 600 dpi and one of the laser beams does not light completely, resulting in formation of an image having omissions, the resolution of the part of the image having such omissions is approximately 300 dpi. Character images having such a resolution cannot be recognized as abnormal, and therefore such images hardly offer a problem practically.

Up to this point, the multi-beam scanning device of the present invention has been explained referring to the embodiments including a laser diode array having four light emitting points $1a_1$ to $1a_4$. However, the present invention is not limited to the multi-beam scanning device including a laser diode array having four light emitting points, and any multi-beam scanning devices including a laser diode array having three or more light emitting points can be used.

As mentioned above, the multi-beam scanning device of the present invention has the following advantages.

Since the multi-beam scanning device of the present invention has constitution such that the interval between one of light emitting points and the adjacent light emitting point is not greater than the minimum recording interval of image information to be recorded on a recording medium and the laser beams emitted by the plural light emitting points form on the recording medium laser beam spots arranged in a line or substantially in a line in a direction orthogonal to the main scanning direction of the laser beams, a latent image having good resolution can be formed on the recording medium at a high speed because plurality laser beams are scanned at a time.

In addition, the deviation in position of the laser beam spots on the recording medium can be minimized while the multi-beam scanning device has constitution as simple as that of one beam scanning devices performing scanning using one beam.

Recording speed of the multi-beam scanning device is faster than scanning devices performing scanning using one or two beams because the number of the laser beams used for scanning is greater than that of the scanning devices. In addition, plural laser beam spots having a suitable diameter can be formed on the recording medium. Therefore, images having good resolution can be formed at a high speed.

According to another embodiment of the multi-beam scanning device of the present invention, any one of the plural laser beams is used as a clock laser beam. Therefore, a detector for detecting the timing of starting to write image information, which has simple constitution and a cost-cost similar to the detectors of one-beam scanning devices, can be used.

According to yet another embodiment of the multi-beam scanning device of the present invention, even if the light emitting point emitting a clock laser beam abnormally lights, the laser beam can be changed to any one of the other laser beams emitted by the normal light emitting points, and therefore the whole multi-beam scanning device does not stop. This is different from the scanning devices in which the clock laser beam is fixed. Therefore the device can be effectively operated.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A multi-beam scanning device, comprising:
   a subassembly including
      a holder including a mounting portion, an engaging section, and a projection,
      a laser diode array disposed on the mounting portion of the holder and having at least three light emitting points arranged in a package at an equal interval and configured to emit respective laser beams that form corresponding laser beam spots on a recording medium at a minimum recording interval, and
      a collimator lens disposed on the projection;
   a bracket defining an engaging hole, the engaging hole of the bracket surrounding and contacting the engaging section of the holder;
   an abnormal lighting detector configured to detect abnormal lighting of the one of the at least three light emitting points configured to emit a clock laser beam; and
   a laser beam changer configured to change the clock laser beam to any one of the laser beams emitted by the other light emitting points normally emitting a laser beam, when the abnormal lighting detector detects abnormal lighting,
   wherein
   the holder and the bracket define voids configured to permit rotation of the holder relative to the bracket before securing the holder to the bracket, and the laser beams from the at least three light emitting points scan the recording medium in a main scanning direction while being at least one of on and off so as to form a light image having the minimum recording interval in the recording medium,
   the equal interval is smaller than the minimum recording interval,
   the at least three light emitting points are arranged such that the corresponding laser beams spots on the recording medium are arranged substantially in a line in a direction orthogonal to the main scanning direction, and
   any one of the laser beams is used as the clock laser beam configured to determine a timing of starting each main scanning.

2. The multi-beam scanning device according to claim 1, wherein a variation in position of the at least three laser beam spots configured to be arranged substantially in a line is not greater than 21.17 μm.

3. The multi-beam scanning device according to claim 1, wherein the equal interval is not greater than 14 μm.

4. An image forming apparatus, comprising:
   a recording medium;
   a subassembly, including
      a holder including a mounting portion, an engaging section, and a projection,
      a laser diode array disposed on the mounting portion of the holder and having at least three light emitting points arranged in a package at an equal interval and configured to emit respective laser beams that form corresponding laser beam spots on the recording medium at a minimum recording interval, and
      a collimator lens disposed on the projection;
   a bracket defining an engaging hole, the engaging hole of the bracket surrounding and contacting the engaging section of the holder;
   an abnormal lighting detector configured to detect abnormal lighting of one of the at least three light emitting points configured to emit a clock laser beam; and
   a laser beam changer configured to change the clock laser beam to any one of the laser beams emitted by the other light emitting points normally emitting a laser beam, when the abnormal lighting detector detects abnormal lighting,
   wherein
   rotation of the holder relative to the bracket before securing the holder to the bracket, and the laser beams from the at least three light emitting points scan the recording medium in a main scanning direction while being at least one of on and off so as to form a light image having the minimum recording interval on the recording medium;
   the equal interval is smaller than the minimum recording interval;
   the at least three light emitting points are arranged such that the corresponding laser beam spots on the recording medium are arranged substantially in a line in a direction orthogonal to the main scanning direction; and
   any one of the laser beams is used as the clock laser beam configured to determine a timing of starting each main scanning.

5. The image forming apparatus according to claim 4, wherein a variation in position of the laser beam spots configured to be arranged substantially in a line is not greater than 21.17 μm.

6. The image forming apparatus according to claim 4, wherein the equal interval is not greater than 14 μm.

7. A multi-beam scanning device, comprising:
   a subassembly including
      a holder including a mounting portion, an engaging section, and a projection,
      a laser emitting means for emitting laser beams disposed on the mounting portion of the holder and comprising at least three light emitting points arranged in a package at an equal interval and configured to emit at least three laser beams to form corresponding laser beam spots on a recording medium at a minimum recording interval, and
      a collimator lens disposed on the projection;
   a bracket defining an engaging hole, the engaging hole of the bracket surrounding and contacting the engaging section of the holder;
   an abnormal lighting detection means for detecting abnormal lighting of one of the at least three light emitting points configured to emit a clock laser beam; and
   a laser beam changing means for changing the clock laser beam to any one of the laser beams emitted by the other three light emitting points normally emitting a laser beam, when the abnormal lighting detection means detects abnormal lighting,
   wherein
   rotation of the holder relative to the bracket before securing the holder to the bracket, and the laser beams from the at least three light emitting points scan the recording medium in a main scanning direction while being at least one of on and off so as to form a light image having the minimum recording interval on the recording medium;

the equal interval is smaller than the minimum recording interval;

the at least three light emitting points are arranged such that the corresponding laser beam spots on the recording medium are arranged substantially in a line in a direction orthogonal to the main scanning direction; and any one of the laser beams is used as a clock laser beam configured to determine a timing of starting each main scanning.

8. The multi-beam scanning device according to claim 7, wherein a variation in position of the laser beam spots arranged substantially in a line is not greater than 21.17 μm.

9. The multi-beam scanning device according to claim 7, wherein the equal interval is not greater than 14 μm.

10. An image forming apparatus, comprising:
   means for recording data thereon;
   a subassembly including
      a holder including a mounting portion, an engaging section, and a projection,
      means for emitting laser beams disposed on the mounting portion of the holder and including at least three light emitting points arranged in a package at an equal interval and for emitting laser beams to form corresponding laser beam spots on the means for recording at a minimum recording interval, and
      a collimator lens disposed on the projection;
   a bracket defining an engaging hole, the engaging hole of the bracket surrounding and contacting the engaging section of the holder;
   means for detecting abnormal lighting of the one of the at least three light emitting points that is used to emit a clock laser beam; and
   means for changing the clock laser beam to any one of the laser beams emitted by the other three light emitting points, when the means for detecting abnormal lighting detects an abnormal lighting condition,
   wherein
   the holder and the bracket define voids configured to permit rotation of the holder relative to the bracket before securing the holder to the bracket,
   the laser beams scan the means for recording in a main scanning direction while being at least one of on and off so as to form a light image having the minimum recording interval on the means for recording,
   the equal interval is smaller than the minimum recording interval,
   the at least three light emitting points are arranged such that the corresponding laser beam spots on the means for recording are arranged substantially in a line in a direction orthogonal to the main scanning direction, and
   any one of the laser beams from the at least three light emitting points is used as the clock laser beam for determining a time to start each main scanning.

11. The image forming apparatus according to claim 10, wherein a variation in position of the at least three laser beam spots arranged substantially in a line is not greater than 21.17 μm.

12. The image forming apparatus according to claim 10, wherein the equal interval is not greater than 14 μm.

13. A multi-beam scanning device, comprising:
   a subassembly including
      a holder including a mounting portion, an engaging section, and a projection,
      a light beam emitting array disposed on the mounting portion of the holder and including three or more light emitting elements, which are arranged at predetermined locations and which emit three or more laser beams to form corresponding laser beam spots on a recording medium at a minimum recording interval, and
      a collimator lens disposed on the projection;
   a bracket defining an engaging hole, the engaging hole of the bracket surrounding and contacting the engaging section of the holder,
   wherein
   the holder and the bracket define voids configured to permit rotation of the holder relative to the bracket before securing the holder to the bracket,
   the three or more laser beams scan the recording medium in a main scanning direction while being put on or off to form a light image having the minimum recording interval on the recording medium, and
   the equal interval is Pi and Pi is set to fulfill the following equation:

$$Pi = (fco/fcy) \cdot (Pi'/\beta s),$$

wherein fco is the focal length of a light collecting element, which collects the light emitted from the light beam emitting array,
   fcy is the focal length of a light beam shaping element, said light beam shaping element shaping the light beam passing through the light collecting element before the light beam is reflected by a light beam deflecting element, said light beam deflecting element deflects the light beams for scanning the recording medium,
   wherein $\beta s$ is the lateral direction magnification in the sub-scanning direction, and
   wherein Pi' is the minimum recording interval.

14. The multi-beam scanning device according to claim 13, wherein a light collecting element is at least approximately arranged such that the optical axis of the light collecting element passes at least approximately through the symmetrical center of the arranged of the light emitting elements.

15. A multi-beam scanning device comprising:
   a subassembly including
      a holder including a mounting portion, an engaging section, and a projection,
      a light beam emitting array disposed on the mounting portion of the holder and comprising three or more light emitting elements, which are arranged at predetermined locations and which emit respective laser beams to form corresponding laser beam spots on a recording medium at a minimum recording interval, and
      a collimator lens disposed on the projection;
   a bracket defining an engaging hole, the engaging hole of the bracket surrounding and contacting the engaging section of the holder;
   an abnormal lighting detector configured to detect abnormal lighting of one of the three or more light emitting elements emitting a clock laser beam; and
   a light beam changer configured to change the clock light beam to any one of the other laser beams emitted by the other light emitting elements normally emitting a light beam, when the abnormal lighting detector detects abnormal lighting,
   wherein
   the holder and the bracket define voids configured to permit rotation of the holder relative to the bracket before securing the holder to the bracket;
   the three or more laser beams scan the recording medium in a main scanning direction while being put on or off to form a light image having the minimum recording interval on the recording medium;

the three or more light emitting elements are arranged such that the corresponding laser beam spots on the recording medium are arranged substantially in a line in a direction orthogonal to the main scanning direction;
the predetermined locations of the three or more light emitting elements are such that the elements are arranged at an equal interval and the equal interval is smaller than the minimum recording interval;
any one of the laser beams from the at least three light emitting points is used as the clock laser beam for determining a time to start each main scanning; and
the abnormal lighting of the one of the three or more light emitting elements represents a deviation of at least one operating characteristic of the one light emitting element from the corresponding at least one target characteristic or represents leaving a target range of target characteristics.

16. A multi-beam scanning device, comprising:
a subassembly including
a holder including a mounting portion, an engaging section, and a projection,
a laser diode array disposed on the mounting portion of the holder and having at least three light emitting points arranged at an equal interval and configured to emit at least three laser beams that form corresponding laser beam spots on a recording medium at a minimum recording interval, and
a collimator lens disposed on the projection;
a bracket defining an engaging hole, the engaging hole of the bracket surrounding and contacting the engaging section of the holder;
an abnormal lighting detector configured to detect abnormal lighting of the one of the at least three light emitting points configured to emit a clock laser beam; and
a laser beam changer configured to change the clock laser beam to any one of the laser beams emitted by the other light emitting points normally emitting a laser beam, when the abnormal lighting detector detects abnormal lighting,
wherein
the holder and the bracket define voids configured to permit rotation of the holder relative to the bracket before securing the holder to the bracket, and
the at least three laser beams from the at least three light emitting points scan the recording medium in a main scanning direction to form a light image having the minimum recording interval in the recording medium.

17. An image forming apparatus comprising:
a recording medium;
a subassembly including
a holder including a mounting portion, an engaging section, and a projection,
a laser diode array disposed on the mounting portion of the holder and having at least three light emitting points arranged at an equal interval and configured to emit at least three laser beams that form corresponding laser beam spots on the recording medium at a minimum recording interval, and
a collimator lens disposed on the projection;
a bracket defining an engaging hole, the engaging hole of the bracket surrounding and contacting the engaging section of the holder;
an abnormal lighting detector configured to detect abnormal lighting of one of the at least three light emitting points configured to emit a clock laser beam; and
a laser beam changer configured to change the clock laser beam to any one of the laser beams emitted by the other light emitting points normally emitting a laser beam, when the abnormal lighting detector detects abnormal lighting,
wherein the holder and the bracket define voids configured to permit rotation of the holder relative to the bracket before securing the holder to the bracket, and
the at least three laser beams from the at least three light emitting points scan the recording medium in a main scanning direction to form a light image having the minimum recording interval on the recording medium.

18. A multi-beam scanning device, comprising:
a subassembly including
a holder including a mounting portion, an engaging section, and a projection,
a laser emitting means for emitting laser beams disposed on the mounting portion of the holder and including at least three light emitting points arranged at an equal interval and configured to emit the at least three laser beams to form corresponding laser beam spots on a recording medium at a minimum recording interval, and
a collimator lens disposed on the projection;
a bracket defining an engaging hole, the engaging hole of the bracket surrounding and contacting the engaging section of the holder;
an abnormal lighting detection means for detecting abnormal lighting of one of the at least three light emitting points configured to emit a clock laser beam; and
a laser beam changing means for changing the clock laser beam to any one of the laser beams emitted by the other three light emitting points normally emitting a laser beam, when the abnormal lighting detection means detects abnormal lighting,
wherein
the holder and the bracket define voids configured to permit rotation of the holder relative to the bracket before securing the holder to the bracket, and
the at least three laser beams from the at least three light emitting points scan the recording medium in a main scanning direction to form a light image having the minimum recording interval on the recording medium.

19. An image forming apparatus comprising:
means for recording data thereon;
a subassembly comprising
a holder comprising a mounting portion, an engaging section, and a projection,
means for emitting laser beams disposed on the mounting portion of the holder and comprising at least three light emitting points arranged at an equal interval and for emitting laser beams to form corresponding laser beam spots on the means for recording at a minimum recording interval, and
a collimator lens disposed on the projection;
a bracket defining an engaging hole, the engaging hole of the bracket surrounding and contacting the engaging section of the holder;
means for detecting abnormal lighting of the one of the at least three light emitting points that is used to emit a clock laser beam; and
means for changing the clock laser beam to any one of the laser beams emitted by the other three light emitting points, when the means for detecting abnormal lighting detects an abnormal lighting condition,
wherein
the holder and the bracket define voids configured to permit rotation of the holder relative to the bracket before securing the holder to the bracket, and the laser beams scan the means for recording in a main scanning direction to form a light image having the minimum recording interval on the means for recording.

* * * * *